Nov. 20, 1956     C. K. MOREHOUSE     2,771,381
DRY CELL
Filed Sept. 30, 1953
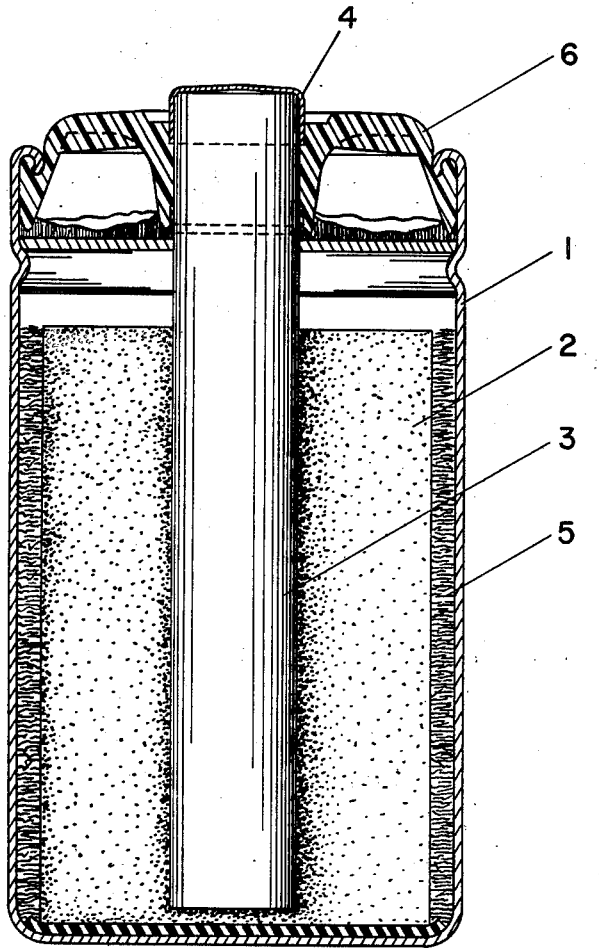
INVENTOR.
CLARENCE K. MOREHOUSE
BY
ATTORNEY

United States Patent Office 2,771,381
Patented Nov. 20, 1956

2,771,381
DRY CELL

Clarence K. Morehouse, Princeton, N. J., assignor to Olin Mathieson Chemical Corporation, a corporation of Virginia Application September 30, 1953, Serial No. 383,391

2 Claims. (Cl. 136—138)

This invention relates to primary galvanic cells of the dry type and more particularly to an improved depolarizer mix for batteries known as dry cells.

Primary galvanic cells of the dry type produced and used commercially, generally consists of the following described construction. An outer shell which generally is a zinc can acts as the anode. Within this shell is a depolarizing assembly which serves as the cathode and is in the form of a core or bobbin made up of carbon, manganese dioxide and a solution of electrolyte molded around or in contact with a metal-capped carbon rod. The carbon rod serves as a means of contact with the cathodic depolarizing assembly while the metal cap of the carbon rod acts as the external terminal. The small amount of space that exists between the depolarizing assembly and the outer shell is filled with a paste containing an electrolyte and a stiffening agent, such as cereal and/or starch which serves the purpose of retaining the electrolyte in a semi-solid or paste condition. The contents of the can are sealed from moisture loss, etc. by a cap of resin-like material.

In operation the manganese dioxide reacts with the hydrogen ions contained in the electrolyte. This reaction results in a formation of hydroxyl ions and basic zinc salts, which causes the pH of the electrolyte to increase. The end result of this harmful basic condition is to limit the effectiveness of the manganese dioxide as a cathodic material.

While prior attempts have been made to avoid this inherent alkalinity, none have heretofore met with the desired degree of success needed to obtain the optimum value of the components used in a cell. As an example, it has been attempted to include free acid in the paste. But while free acid offsets the harmful effect of the alkalinity, it also causes the more harmful corrosion of the zinc can.

An object of this invention is, therefore, to produce an improved dry cell having a longer cell life. Another object of this invention is to produce an improved dry cell which can deliver a more stable voltage under a sustained load. A further object of this invention is a dry cell having an improved capacity recovery. A still further object of this invention is to provide a depolarizer composition for a dry cell having resistance to changes in pH and to formation of basic zinc salts. Other objects and advantages of this invention will be apparent to those skilled in the art upon a reading of the following disclosure.

It has now been found that the foregoing objects and advantages can be obtained in accordance with this invention by incorporating a suitable ion exchange resin in the depolarizer mix of the dry cell. More specifically, it has been found that the inclusion of certain buffer-acting ion exchange resins of the cation type in the depolarizer mix of the cell results in its improved operation.

The drawing which accompanies this application shows a cross sectional view of a dry cell which is a typical embodiment of this invention.

As shown the dry cell consists of an outer zinc can 1, which acts as the anode. The cathode consists of a bobbin 2 of depolarizer material containing cationic ion exchange resin and a carbon rod or pencil 3. The rod or pencil is capped with a metal cap 4. Separating the cathode from the anode is a paste 5 which is described in more detail below. The entire contents within the can are sealed in with a resinous cap 6 through which the carbon rod or pencil extends.

The cell of this invention as shown in the drawing may be constructed according to the procedures generally used in the trade, however, in making up the core or bobbin the following procedure with certain modifications where obviously necessary should be used. Natural or synthetic manganese dioxide generally used for dry cells, conductive carbon, and a suitable ion exchange resin is mixed in the dry state. A suitable electrolyte solution is then added with stirring until a paste-like consistency is obtained. This paste is then shaped into a core or bobbin by the general procedure used in the trade and can then be used in the cell produced by the trade.

To show the improved operation of the cell of this invention, a comparison is here shown of a group of cells made identical in structure and in composition, except for the inclusion or exclusion of ion-exchange resin in the depolarizer mix. This group can be exemplified by the following listing of ingredients used in their construction:

Depolarizer used:
  4 parts $MnO_2$ ore
  1 part acetylene black
Electrolyte used:
  25.0% LiCl
  75.0% $H_2O$
Resistance—7.5 ohms internal resistance
Temperature of each cell—21° C.

Each group contained cells in which ion exchange resin either had or had not been added to the depolarizer mix. These cells were stored at +21° C. and then subjected to short circuit testing. The results were as follows:

| Cell | 1 | 2 | 3 |
|---|---|---|---|
| Type resin used | None | Amberlite XE-64. | Amberlite XE-64. |
| Amt. resin used: (gms./250 gms.) | | 35 gms. | 60 gms. |
| | | Discharge Time (min.) | |
| Closed Circuit Voltage: | | | |
| 1.40 volts | 34 | 37 | 31 |
| 1.20 volts | 86 | 105 | 101 |
| 1.00 volt | 210 | 242 | 267 |
| 0.90 volt | 289 | 327 | 361 |
| 0.75 volt | 372 | 437 | 490 |

As shown in the table, the addition of 35 grams of ion exchange resin to a cell was found to increase the time required to deplete the cell to 0.75 volt closed circuit voltage by 65 minutes, while 65 grams resulted in an increase of 118 minutes. It is, therefore, obvious that the ion exchange resin-containing-cell, by taking a longer time to deplete, has a longer cell life than the non-resin-containing cell and can thus be considered an improved cell over that heretofore known.

The exact theory for the operation of such ion exchange resin-containing-cell is not fully understood but it is believed that in the operation of the cell, the zinc electrode reacts with the electrolyte to produce $ZnCl_2$ and electrons as follows:

$$Zn + 2Cl^- \rightarrow ZnCl_2 + 2e \quad (1)$$

The $MnO_2$ of the depolarizer mix then is believed to use the electrons produced by Equation 1 with hydrogen ions from water contained in the cell:

$$2MnO_2 + H^+ + 2e \rightarrow Mn_2O_3 + OH^- \quad (2)$$

Ion exchange resin (represented as $R(H)_{2n}$) present in the depolarizer mix being an acidic cation type of resin is then believed to react with the $Zn^{++}$ ion produced in Equation 1 to produce free $H^+$ ions:

$$R(H)_{2n} + nZn^{++} \rightarrow R(Zn)_n + 2n(H^+) \quad (3)$$

and the $H^+$ ions are believed to combine with the $OH^-$ ions resulting from Equation 2 to repress the alkalinity:

$$H^+ + OH^- \rightarrow HOH \quad (4)$$

The end result is a well buffered overall reaction.

Any synthetic ion-exchange resin which inhibits any rise in pH, i. e., acts as a buffering agent, and which is unreactive with the ingredients of the cell, may be used in accordance with this invention. For example, it has been specifically found that a resin such as XE–64 Amberlite is particularly suited for this purpose and especially for low temperature cells using a LiCl electrolyte. The sulfonated polystyrene resins, the sulfonated phenol-formaldehyde condensation product resins and the carboxylic resins such as XE–64 Amberlite made by condensing $\alpha,\beta$ unsaturated carboxylic acids, such as acrylic or maleic with polymerizable vinyl compounds are those contemplated within this invention.

The exact selection of specific ion exchange resin to be used for optimum results depends upon the electrolyte being used in the cell. As stated above, it must act as a buffering agent and be unreactive with the ingredients of the cell. For example, as shown in the table, it has been found that the carboxylic resins, more specifically XE–64 Amberlite resin, were especially suitable for low temperature LiCl type dry cells.

Cells having other electrolytes such as $ZnCl_2$—$NH_4Cl$; $LiCl$—$ZnCl_2$—$NH_4Cl$; $CaCl_2$—$ZnCl_4$—$NH_4Cl$; $LiBr$—$MgBr_2$ may also be advantageously used along with the ion exchange resins in the depolarizer mix in accordance with this invention.

Having thus described the invention, what is claimed and desired to be secured by Letters Patent is:

1. In the manufacture of a depolarizer mix for dry cells, the improvement which comprises intermixing with said depolarizer a cation exchange resin in its acid condition.

2. A dry cell having an anode can and within the can a bobbin of depolarizer mix about a carbon rod, said depolarizer mix containing a cation exchange resin in its acid condition intimately associated with particles of manganese dioxide and a separate layer of paste free of said resin containing an electrolyte separating said bobbin from the side walls of said can, whereby hydroxyl ions formed upon discharge of the cell are combined with hydrogen ions to repress increase in pH of the depolarizer bobbin.

References Cited in the file of this patent
UNITED STATES PATENTS

| | | |
|---|---|---|
| 2,403,571 | Wilke | July 9, 1946 |
| 2,607,809 | Pitzer | Aug. 19, 1952 |
| 2,636,851 | Juda et al. | Apr. 28, 1953 |